(12) United States Patent
Flohr et al.

(10) Patent No.: US 11,983,847 B2
(45) Date of Patent: May 14, 2024

(54) METHOD AND DEVICE FOR NOISE REDUCTION IN IMAGE RECORDINGS

(71) Applicant: Siemens Healthcare GmbH, Erlangen (DE)

(72) Inventors: Thomas Flohr, Uehlfeld (DE); Rainer Raupach, Heroldsbach (DE); Bernhard Schmidt, Fuerth (DE)

(73) Assignee: Siemens Healthineers AG, Forchheim (DE)

( * ) Notice: Subject to any disclaimer, the term of this patent is extended or adjusted under 35 U.S.C. 154(b) by 658 days.

(21) Appl. No.: 17/034,148

(22) Filed: Sep. 28, 2020

(65) Prior Publication Data

US 2021/0110517 A1 Apr. 15, 2021

(30) Foreign Application Priority Data

Oct. 9, 2019 (DE) ...................... 10 2019 215 460.3

(51) Int. Cl.
*G06T 5/00* (2006.01)
*G06N 20/00* (2019.01)

(52) U.S. Cl.
CPC .............. *G06T 5/002* (2013.01); *G06N 20/00* (2019.01); *G06T 2207/10081* (2013.01); *G06T 2207/20081* (2013.01); *G06T 2207/30004* (2013.01)

(58) Field of Classification Search
CPC ........... G06T 5/002; G06T 2207/10081; G06T 2207/20081; G06T 2207/30004; G06T 2207/20084; G06T 5/20; G06N 20/00; G06N 3/045; G06N 3/08; G06N 7/01
See application file for complete search history.

(56) References Cited

U.S. PATENT DOCUMENTS

| 11,234,666 | B2* | 2/2022 | Chan | A61B 6/032 |
| 11,517,197 | B2* | 12/2022 | Zhou | G06T 11/005 |
| 2016/0012569 | A1* | 1/2016 | Hanada | G06T 5/50 |
| | | | | 382/131 |

(Continued)

FOREIGN PATENT DOCUMENTS

| CN | 108564553 A | 9/2018 |
| CN | 109102550 A | 12/2018 |

(Continued)

OTHER PUBLICATIONS

CT Image Denoising Based on Thresholding in Shearlet Domain (Year: 2017).*

(Continued)

*Primary Examiner* — Nizar N Sivji
(74) *Attorney, Agent, or Firm* — Harness, Dickey & Pierce, P.L.C.

(57) ABSTRACT

A method is for noise reduction in image recordings. In an embodiment, the method includes providing an input image; de-noising the input image and producing a de-noised input image; and adapting noise texture of pixels of the de-noised input image via an adaptation method, noise amplitude of the de-noised input image being largely retained and the noise texture of the pixels of the de-noised input image being adapted to correspond largely to a defined noise texture. A corresponding device, a production method for an adaptation device, such an adaptation device, and a control facility and a computed tomography system are also disclosed.

16 Claims, 4 Drawing Sheets

(56) References Cited

U.S. PATENT DOCUMENTS

| | | | | |
|---|---|---|---|---|
| 2016/0171727 | A1* | 6/2016 | Bouchard | G06T 5/002 382/131 |
| 2016/0314350 | A1* | 10/2016 | Mathieu | H04N 25/60 |
| 2017/0337687 | A1* | 11/2017 | Wang | G06T 7/11 |
| 2018/0089807 | A1* | 3/2018 | Reusch | G06T 5/50 |
| 2018/0144466 | A1* | 5/2018 | Hsieh | G06T 7/0012 |
| 2018/0293762 | A1* | 10/2018 | Fu | G06T 11/003 |
| 2019/0104940 | A1* | 4/2019 | Zhou | A61B 5/0073 |
| 2019/0108904 | A1* | 4/2019 | Zhou | G06T 5/50 |
| 2019/0209867 | A1 | 7/2019 | Sun et al. | |
| 2019/0251713 | A1* | 8/2019 | Chen | A61B 6/482 |
| 2019/0378270 | A1* | 12/2019 | Ida | G01R 33/5608 |
| 2020/0020097 | A1* | 1/2020 | Do | G06F 18/2413 |
| 2020/0311878 | A1* | 10/2020 | Matsuura | G06V 10/82 |
| 2021/0074036 | A1* | 3/2021 | Fuchs | G06N 3/045 |
| 2022/0180482 | A1* | 6/2022 | Wang | A61B 5/0033 |

FOREIGN PATENT DOCUMENTS

| | | | | | |
|---|---|---|---|---|---|
| CN | 109493951 | A | * | 3/2019 | A61N 5/1039 |
| CN | 109493951 | A | | 3/2019 | |
| CN | 109978778 | A | * | 7/2019 | |
| CN | 109978778 | A | | 7/2019 | |
| CN | 110858391 | A | * | 3/2020 | A61B 5/0033 |
| CN | 109598680 | B | * | 11/2021 | G06T 5/002 |
| WO | WO-2016171624 | A1 | * | 10/2016 | G02B 27/0025 |

OTHER PUBLICATIONS

Zhao, Hang et al. "Loss Functions for Image Restoration with Neural Networks" arXiv: 1511.08861, Apr. 20, 2018.

Tatsugami, F. et al. "Deep learning-based image restoration algorithm for coronary CT angiography" European Radiology, pp. 5322-5329, Apr. 8, 2019.

Ehman, E. C. et al. "Methods for clinical evaluation of noise reduction techniques in abdominopelvic CT" Radiographics, pp. 849-862, 2014.

German Office Action for German Application No. 10-2015 215 460.3 dated Jul. 23, 2020.

* cited by examiner

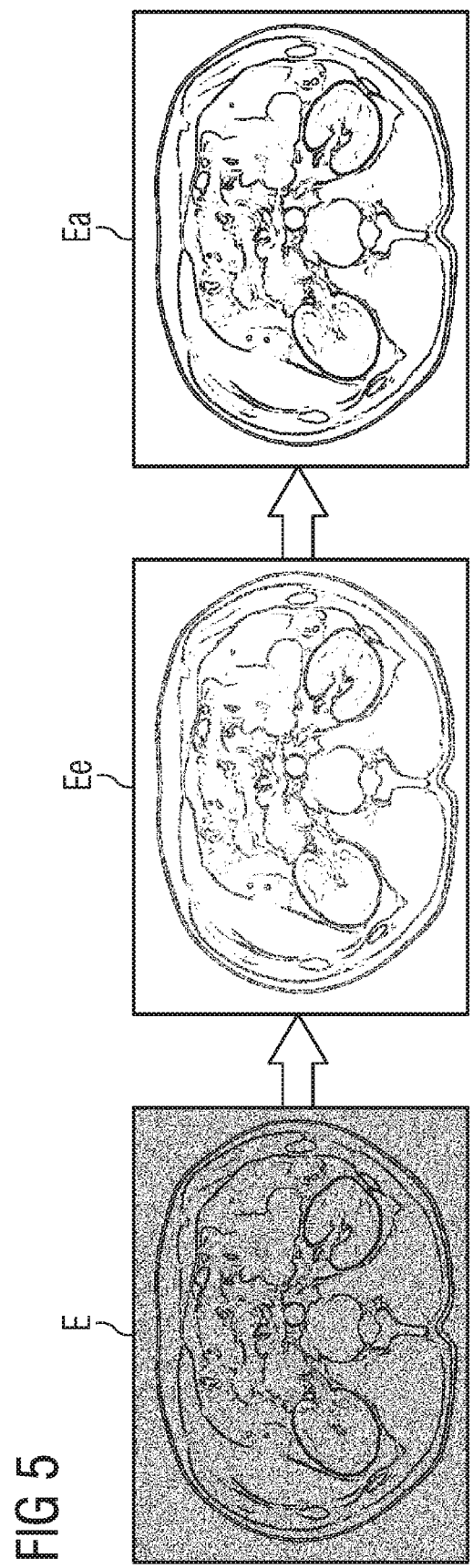

METHOD AND DEVICE FOR NOISE REDUCTION IN IMAGE RECORDINGS

PRIORITY STATEMENT

The present application hereby claims priority under 35 U.S.C. § 119 to German patent application number DE 102019215460.3 filed Oct. 9, 2019, the entire contents of which are hereby incorporated herein by reference.

FIELD

Embodiments of the invention generally relate to a method and a device for noise reduction in image recordings, in particular CT recordings.

BACKGROUND

Image recordings usually include noise. Although the degree of the noise depends primarily on the quality of the recording unit (e.g. the image detector), the intensity that is present during the image recording determines the noise in the recording in practical use. For example, photographs taken at dusk contain more noise than photographs taken in broad daylight. The same applies to recordings produced using x-ray radiation, e.g. CT recordings. The higher the radiation dose the lower the noise component, and the lower the radiation dose the higher the noise component.

Computed tomography (CT) is a very important and often used examination method. In the context of CT, a patient is exposed to high-energy radiation (typically x-ray radiation) from various directions and the radiation that penetrates a patient is detected in each case to produce images, in particular 3D images or slices of 2D images. Since high-energy radiation always poses a risk to the patient, it is endeavored to keep the dose as low as possible. However, the aforementioned effect typically occurs here, i.e. the noise component in the image recordings increases as the dose decreases.

Numerous methods exist to reduce this noise component in reconstructed CT images or directly in the raw data thereof, e.g. iterative reconstruction or non-linear image filters. It is often endeavored in this case to reduce the noise while maintaining the structure, i.e. to avoid changing any data other than the noise.

Other image recordings can also by artificially de-noised. For example, photographs with noise can be improved in this way.

SUMMARY

The inventors have discovered that when set at a high level, noise suppression often gives rise to disadvantageous side effects which cause the images to appear "artificial". This applies to the noise texture in particular. The term "noise texture" refers to the shape of the noise component of the pixels of the digital image. As a rule, the noise component has a Gaussian shape, but can readily exhibit other shapes. In the case of digital images, the noise is reflected in differences of intensity of adjacent pixels.

The inventors have discovered that these negative side effects are often counteracted by applying noise suppression methods in a moderated form for clinical purposes, though naturally this negatively restricts the effect that was originally intended, namely noise reduction. This therefore likewise limits the potential of these methods to reduce the radiation dose since the noise increases again.

At least one embodiment of the present invention specifies an alternative, more convenient method and a corresponding device for noise reduction in image recordings, by which it is possible to avoid or mitigate at least one of the disadvantages described above. In particular, at least one embodiment of the invention achieves a reduction in the visually relevant variations from "the norm", i.e. CT images reconstructed using linear methods (filtered back-projection).

Embodiments of the invention are directed to a method, a device, a production method, an adaptation device, a control facility and a computed tomography system.

In at least one embodiment, a method comprises:
providing an input image;
de-noising the input image and producing a de-noised input image; and
adapting the noise texture of pixels of the de-noised input image by way of an adaptation method, wherein the noise amplitude of the de-noised input image is largely retained and the noise texture of the pixels of the de-noised input image is adapted in such a way as to correspond largely to a predefined noise texture.

At least one embodiment of the invention is directed to a device for noise reduction in image recordings, comprising:
a data interface designed to provide a digital input image;
a de-noising unit designed to de-noise the image and produce a de-noised image; and
an adaptation device designed to adapt the noise texture of pixels of the de-noised image by way of an adaptation method, wherein the noise amplitude of the de-noised image is largely retained and the noise texture of the pixels of the de-noised image is adapted in such a way as to correspond largely to a predefined noise texture.

A production method according to at least one embodiment of the invention comprises:
providing a multiplicity of initial training images that were recorded with a predefined dose;
adding noise to the training images, such that the resulting added-noise training images correspond in respect of the type of added noise to the input images that are to be processed;
de-noising the added-noise training images and creating de-noised training images; and
training the learning-capable algorithm with the "target" of adapting the de-noised training images to the initial training images in respect of the shape of the noise.

An inventive adaptation device for executing the adaptation method in the context of a method according to at least one embodiment of the invention comprises a learning-capable algorithm that has been trained by way of a production method according to at least one embodiment of the invention.

An inventive control facility of at least one embodiment for controlling a computed tomography system is designed to perform a method according to at least one embodiment of the invention and/or the production method according to at least one embodiment of the invention and/or comprises a device according to at least one embodiment of the invention.

An inventive computed tomography system of at least one embodiment comprises a control facility according to at least one embodiment of the invention.

To this extent, at least one embodiment is also directed to a corresponding computer program product comprising a computer program which can be loaded directly into a computing system or a storage facility of a control facility of a computed tomography system, with program sections for executing all steps of at least one embodiment of the inventive method when the program is executed in the computing system or the control facility. In addition to the computer program, such a computer program product can optionally comprise additional parts such as e.g. documentation and/or additional components including hardware components such as e.g. hardware keys (dongles etc.) for using the software.

For transportation to the computing system or the control facility and/or for storage at or in the computing system or the control facility, use can be made of a computer-readable medium, e.g. a memory stick, a hard disk or other transportable or integrated data medium, on which are stored the program sections of the computer program that can be read in and executed by a computing system or a computer unit of the control facility. For this purpose, the computer unit can have e.g. one or more interworking microprocessors or similar.

At least one embodiment is directed to a method for noise reduction in an image, comprising:
providing an input image;
de-noising the input image and producing a de-noised input image; and
adapting noise texture of pixels of the de-noised input image via an adaptation method, noise amplitude of the de-noised input image being largely retained and the noise texture of the pixels of the de-noised input image being adapted to correspond largely to a defined noise texture.

At least one embodiment is directed to a device for noise reduction in image recordings, comprising:
a data interface, designed to provide an input image;
a de-noising device, designed to de-noise the input image and produce a de-noised input image; and
an adaptation device, designed to adapt noise texture of pixels of the de-noised input image via an adaptation method, noise amplitude of the de-noised input image being largely retained and the noise texture of the pixels of the de-noised input image being adapted to correspond largely to a defined noise texture.

At least one embodiment is directed to a production method for producing an adaptation device including a learning-capable algorithm, comprising training the learning-capable algorithm by at least:
providing a multiplicity of initial training images recorded with a defined dose;
adding noise to the multiplicity of initial training images resulting in added-noise training images, corresponding in respect of a type of added noise, to the input images to be processed in the method of an embodiment;
de-noising the added-noise training images and creating de-noised training images; and
training the learning-capable algorithm with a target of adapting the de-noised training images to the multiplicity of initial training images in respect of a shape of the noise.

At least one embodiment is directed to an adaptation device for executing the adaptation method, comprising a learning-capable algorithm trained via the production method of an embodiment.

At least one embodiment is directed to a control facility for controlling a computed tomography system, comprising: the device of an embodiment.

At least one embodiment is directed to a computed tomography system comprising the control facility of an embodiment.

At least one embodiment is directed to a non-transitory computer program product storing a computer program, directly loadable into a storage facility of a control facility of a computed tomography system, the program sections being configured to execute the method as of an embodiment when the computer program is executed in the control facility.

At least one embodiment is directed to a non-transitory computer-readable medium storing program sections, readable and executable by a computer unit, to execute the method of an embodiment when the program sections are executed by the computer unit.

BRIEF DESCRIPTION OF THE DRAWINGS

The invention is explained again in greater detail below based upon example embodiments and with reference to the appended figures. Identical components in this case are denoted by identical reference signs in the various figures. The figures are not generally to scale.

FIG. 5 shows the change of an input image in the context of a preferred method.

DETAILED DESCRIPTION OF THE EXAMPLE EMBODIMENTS

Figure 1:
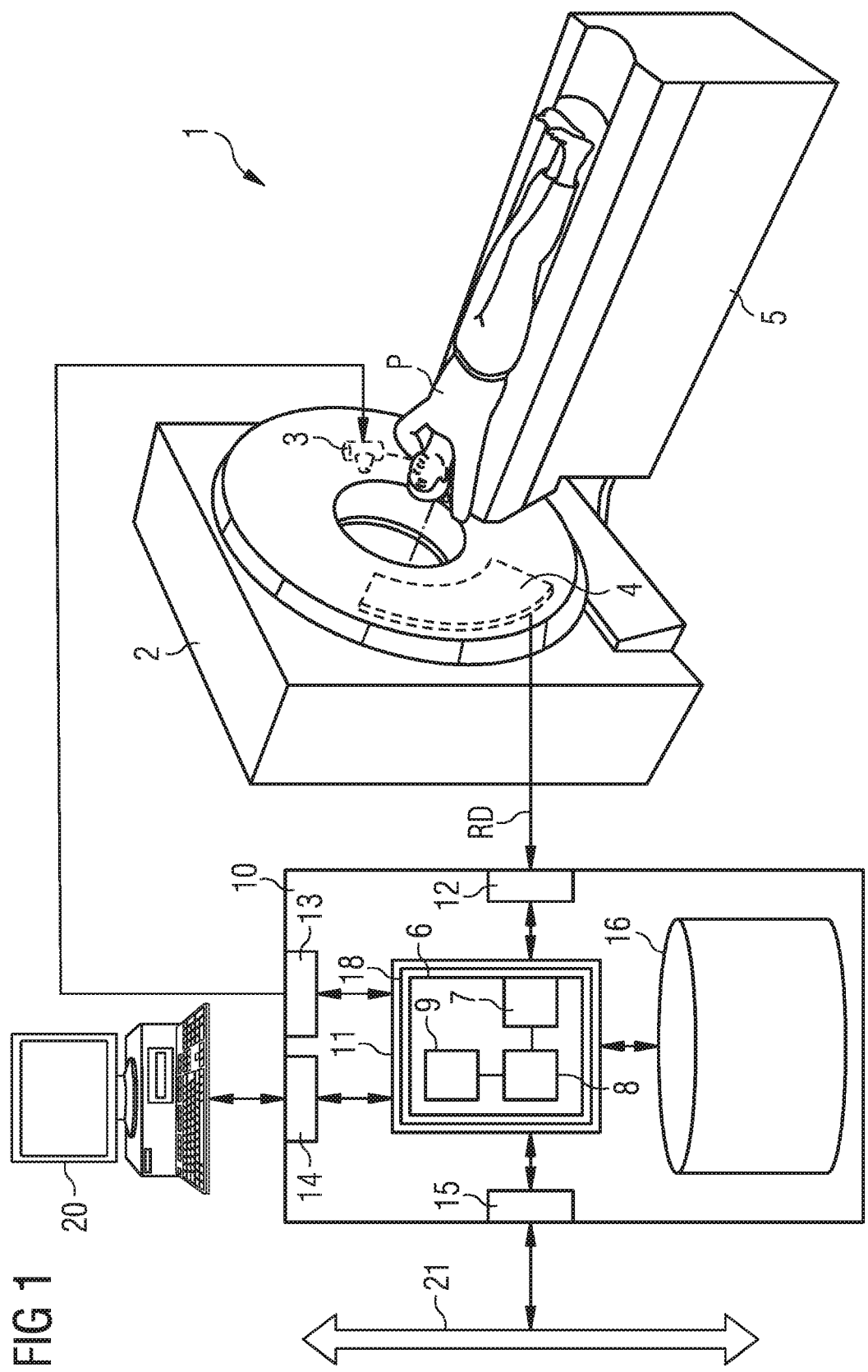
FIG. 1 shows a simple schematic representation of a computed tomography system with an example embodiment of a control facility comprising a device according to the invention for performing the method.

The drawings are to be regarded as being schematic representations and elements illustrated in the drawings are not necessarily shown to scale. Rather, the various elements are represented such that their function and general purpose become apparent to a person skilled in the art. Any connection or coupling between functional blocks, devices, components, or other physical or functional units shown in the drawings or described herein may also be implemented by an indirect connection or coupling. A coupling between components may also be established over a wireless connection. Functional blocks may be implemented in hardware, firmware, software, or a combination thereof.

Various example embodiments will now be described more fully with reference to the accompanying drawings in which only some example embodiments are shown. Specific structural and functional details disclosed herein are merely representative for purposes of describing example embodiments. Example embodiments, however, may be embodied in various different forms, and should not be construed as being limited to only the illustrated embodiments. Rather, the illustrated embodiments are provided as examples so that this disclosure will be thorough and complete, and will fully convey the concepts of this disclosure to those skilled in the art. Accordingly, known processes, elements, and techniques, may not be described with respect to some example embodiments. Unless otherwise noted, like reference characters denote like elements throughout the attached drawings and written description, and thus descriptions will not be repeated. The present invention, however, may be embodied in many alternate forms and should not be construed as limited to only the example embodiments set forth herein.

It will be understood that, although the terms first, second, etc. may be used herein to describe various elements, components, regions, layers, and/or sections, these elements, components, regions, layers, and/or sections, should not be limited by these terms. These terms are only used to distinguish one element from another. For example, a first element could be termed a second element, and, similarly, a second element could be termed a first element, without departing from the scope of example embodiments of the present invention. As used herein, the term "and/or," includes any and all combinations of one or more of the associated listed items. The phrase "at least one of" has the same meaning as "and/or".

Spatially relative terms, such as "beneath," "below," "lower," "under," "above," "upper," and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below," "beneath," or "under," other elements or features would then be oriented "above" the other elements or features. Thus, the example terms "below" and "under" may encompass both an orientation of above and below. The device may be otherwise oriented (rotated 90 degrees or at other orientations) and the spatially relative descriptors used herein interpreted accordingly. In addition, when an element is referred to as being "between" two elements, the element may be the only element between the two elements, or one or more other intervening elements may be present.

Spatial and functional relationships between elements (for example, between modules) are described using various terms, including "connected," "engaged," "interfaced," and "coupled." Unless explicitly described as being "direct," when a relationship between first and second elements is described in the above disclosure, that relationship encompasses a direct relationship where no other intervening elements are present between the first and second elements, and also an indirect relationship where one or more intervening elements are present (either spatially or functionally) between the first and second elements. In contrast, when an element is referred to as being "directly" connected, engaged, interfaced, or coupled to another element, there are no intervening elements present. Other words used to describe the relationship between elements should be interpreted in a like fashion (e.g., "between," versus "directly between," "adjacent," versus "directly adjacent," etc.).

The terminology used herein is for the purpose of describing particular embodiments only and is not intended to be limiting of example embodiments of the invention. As used herein, the singular forms "a," "an," and "the," are intended to include the plural forms as well, unless the context clearly indicates otherwise. As used herein, the terms "and/or" and "at least one of" include any and all combinations of one or more of the associated listed items. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Expressions such as "at least one of," when preceding a list of elements, modify the entire list of elements and do not modify the individual elements of the list. Also, the term "example" is intended to refer to an example or illustration.

When an element is referred to as being "on," "connected to," "coupled to," or "adjacent to," another element, the element may be directly on, connected to, coupled to, or adjacent to, the other element, or one or more other intervening elements may be present. In contrast, when an element is referred to as being "directly on," "directly connected to," "directly coupled to," or "immediately adjacent to," another element there are no intervening elements present.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art and will not be interpreted in an idealized or overly formal sense unless expressly so defined herein.

Before discussing example embodiments in more detail, it is noted that some example embodiments may be described with reference to acts and symbolic representations of operations (e.g., in the form of flow charts, flow diagrams, data flow diagrams, structure diagrams, block diagrams, etc.) that may be implemented in conjunction with units and/or devices discussed in more detail below. Although discussed in a particularly manner, a function or operation specified in a specific block may be performed differently from the flow specified in a flowchart, flow diagram, etc. For example, functions or operations illustrated as being performed serially in two consecutive blocks may actually be performed simultaneously, or in some cases be performed in reverse order. Although the flowcharts describe the operations as sequential processes, many of the operations may be performed in parallel, concurrently or simultaneously. In addition, the order of operations may be re-arranged. The processes may be terminated when their operations are completed, but may also have additional steps not included in the figure. The processes may correspond to methods, functions, procedures, subroutines, subprograms, etc.

Specific structural and functional details disclosed herein are merely representative for purposes of describing example embodiments of the present invention. This invention may, however, be embodied in many alternate forms and should not be construed as limited to only the embodiments set forth herein.

Units and/or devices according to one or more example embodiments may be implemented using hardware, software, and/or a combination thereof. For example, hardware devices may be implemented using processing circuitry such as, but not limited to, a processor, Central Processing Unit (CPU), a controller, an arithmetic logic unit (ALU), a digital signal processor, a microcomputer, a field programmable gate array (FPGA), a System-on-Chip (SoC), a programmable logic unit, a microprocessor, or any other device capable of responding to and executing instructions in a defined manner. Portions of the example embodiments and corresponding detailed description may be presented in terms of software, or algorithms and symbolic representations of operation on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, or as is apparent from the discussion, terms such as "processing" or "computing" or "calculating" or "determining" of "displaying" or the like, refer to the action and processes of a computer system, or similar electronic computing device/ hardware, that manipulates and transforms data represented as physical, electronic quantities within the computer system's registers and memories into other data similarly represented as physical quantities within the computer system memories or registers or other such information storage, transmission or display devices.

In this application, including the definitions below, the term 'module' or the term 'controller' may be replaced with the term 'circuit.' The term 'module' may refer to, be part of, or include processor hardware (shared, dedicated, or group) that executes code and memory hardware (shared, dedicated, or group) that stores code executed by the processor hardware.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

Software may include a computer program, program code, instructions, or some combination thereof, for independently or collectively instructing or configuring a hardware device to operate as desired. The computer program and/or program code may include program or computer-readable instructions, software components, software modules, data files, data structures, and/or the like, capable of being implemented by one or more hardware devices, such as one or more of the hardware devices mentioned above. Examples of program code include both machine code produced by a compiler and higher level program code that is executed using an interpreter.

For example, when a hardware device is a computer processing device (e.g., a processor, Central Processing Unit (CPU), a controller, an arithmetic logic unit (ALU), a digital signal processor, a microcomputer, a microprocessor, etc.), the computer processing device may be configured to carry out program code by performing arithmetical, logical, and input/output operations, according to the program code. Once the program code is loaded into a computer processing device, the computer processing device may be programmed to perform the program code, thereby transforming the computer processing device into a special purpose computer processing device. In a more specific example, when the program code is loaded into a processor, the processor becomes programmed to perform the program code and operations corresponding thereto, thereby transforming the processor into a special purpose processor.

Software and/or data may be embodied permanently or temporarily in any type of machine, component, physical or virtual equipment, or computer storage medium or device, capable of providing instructions or data to, or being interpreted by, a hardware device. The software also may be distributed over network coupled computer systems so that the software is stored and executed in a distributed fashion. In particular, for example, software and data may be stored by one or more computer readable recording mediums, including the tangible or non-transitory computer-readable storage media discussed herein.

Even further, any of the disclosed methods may be embodied in the form of a program or software. The program or software may be stored on a non-transitory computer readable medium and is adapted to perform any one of the aforementioned methods when run on a computer device (a device including a processor). Thus, the non-transitory, tangible computer readable medium, is adapted to store information and is adapted to interact with a data processing facility or computer device to execute the program of any of the above mentioned embodiments and/or to perform the method of any of the above mentioned embodiments.

Example embodiments may be described with reference to acts and symbolic representations of operations (e.g., in the form of flow charts, flow diagrams, data flow diagrams, structure diagrams, block diagrams, etc.) that may be implemented in conjunction with units and/or devices discussed in more detail below. Although discussed in a particularly manner, a function or operation specified in a specific block may be performed differently from the flow specified in a flowchart, flow diagram, etc. For example, functions or operations illustrated as being performed serially in two consecutive blocks may actually be performed simultaneously, or in some cases be performed in reverse order.

According to one or more example embodiments, computer processing devices may be described as including various functional units that perform various operations and/or functions to increase the clarity of the description. However, computer processing devices are not intended to be limited to these functional units. For example, in one or more example embodiments, the various operations and/or functions of the functional units may be performed by other ones of the functional units. Further, the computer processing devices may perform the operations and/or functions of the various functional units without sub-dividing the operations and/or functions of the computer processing units into these various functional units.

Units and/or devices according to one or more example embodiments may also include one or more storage devices. The one or more storage devices may be tangible or non-transitory computer-readable storage media, such as random access memory (RAM), read only memory (ROM), a permanent mass storage device (such as a disk drive), solid state (e.g., NAND flash) device, and/or any other like data storage mechanism capable of storing and recording data. The one or more storage devices may be configured to store computer programs, program code, instructions, or some combination thereof, for one or more operating systems and/or for implementing the example embodiments described herein. The computer programs, program code, instructions, or some combination thereof, may also be loaded from a separate computer readable storage medium into the one or more storage devices and/or one or more computer processing devices using a drive mechanism. Such separate computer readable storage medium may include a Universal Serial Bus (USB) flash drive, a memory stick, a Blu-ray/DVD/CD-ROM drive, a memory card, and/or other like computer readable storage media. The computer programs, program code, instructions, or some combination thereof, may be loaded into the one or more storage devices and/or the one or more computer processing devices from a remote data storage device via a network interface, rather than via a local computer readable storage medium. Additionally, the computer programs, program code, instructions, or some combination thereof, may be loaded into the one or more storage devices and/or the one or more processors from a remote computing system that is configured to transfer and/or distribute the computer programs, program code, instructions, or some combination thereof, over a network. The remote computing system may transfer and/or distribute the computer programs, program code, instructions, or some combination thereof, via a wired interface, an air interface, and/or any other like medium.

The one or more hardware devices, the one or more storage devices, and/or the computer programs, program code, instructions, or some combination thereof, may be specially designed and constructed for the purposes of the example embodiments, or they may be known devices that are altered and/or modified for the purposes of example embodiments.

A hardware device, such as a computer processing device, may run an operating system (OS) and one or more software applications that run on the OS. The computer processing device also may access, store, manipulate, process, and create data in response to execution of the software. For simplicity, one or more example embodiments may be exemplified as a computer processing device or processor; however, one skilled in the art will appreciate that a hardware device may include multiple processing elements or processors and multiple types of processing elements or processors. For example, a hardware device may include multiple processors or a processor and a controller. In addition, other processing configurations are possible, such as parallel processors.

The computer programs include processor-executable instructions that are stored on at least one non-transitory computer-readable medium (memory). The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc. As such, the one or more processors may be configured to execute the processor executable instructions.

The computer programs may include: (i) descriptive text to be parsed, such as HTML (hypertext markup language) or XML (extensible markup language), (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Haskell, Go, SQL, R, Lisp, Java®, Fortran, Perl, Pascal, Curl, OCaml, Javascript®, HTML5, Ada, ASP (active server pages), PHP, Scala, Eiffel, Smalltalk, Erlang, Ruby, Flash®, Visual Basic®, Lua, and Python®.

Further, at least one embodiment of the invention relates to the non-transitory computer-readable storage medium including electronically readable control information (processor executable instructions) stored thereon, configured in such that when the storage medium is used in a controller of a device, at least one embodiment of the method may be carried out.

The computer readable medium or storage medium may be a built-in medium installed inside a computer device main body or a removable medium arranged so that it can be separated from the computer device main body. The term computer-readable medium, as used herein, does not encompass transitory electrical or electromagnetic signals propagating through a medium (such as on a carrier wave); the term computer-readable medium is therefore considered tangible and non-transitory. Non-limiting examples of the non-transitory computer-readable medium include, but are not limited to, rewriteable non-volatile memory devices (including, for example flash memory devices, erasable programmable read-only memory devices, or a mask read-only memory devices); volatile memory devices (including, for example static random access memory devices or a dynamic random access memory devices); magnetic storage media (including, for example an analog or digital magnetic tape or a hard disk drive); and optical storage media (including, for example a CD, a DVD, or a Blu-ray Disc). Examples of the media with a built-in rewriteable non-volatile memory, include but are not limited to memory cards; and media with a built-in ROM, including but not limited to ROM cassettes; etc. Furthermore, various information regarding stored images, for example, property information, may be stored in any other form, or it may be provided in other ways.

The term code, as used above, may include software, firmware, and/or microcode, and may refer to programs, routines, functions, classes, data structures, and/or objects. Shared processor hardware encompasses a single microprocessor that executes some or all code from multiple modules. Group processor hardware encompasses a microprocessor that, in combination with additional microprocessors, executes some or all code from one or more modules. References to multiple microprocessors encompass multiple microprocessors on discrete dies, multiple microprocessors on a single die, multiple cores of a single microprocessor, multiple threads of a single microprocessor, or a combination of the above.

Shared memory hardware encompasses a single memory device that stores some or all code from multiple modules. Group memory hardware encompasses a memory device that, in combination with other memory devices, stores some or all code from one or more modules.

The term memory hardware is a subset of the term computer-readable medium. The term computer-readable medium, as used herein, does not encompass transitory electrical or electromagnetic signals propagating through a medium (such as on a carrier wave); the term computer-readable medium is therefore considered tangible and non-transitory. Non-limiting examples of the non-transitory computer-readable medium include, but are not limited to, rewriteable non-volatile memory devices (including, for example flash memory devices, erasable programmable read-only memory devices, or a mask read-only memory devices); volatile memory devices (including, for example static random access memory devices or a dynamic random access memory devices); magnetic storage media (including, for example an analog or digital magnetic tape or a hard disk drive); and optical storage media (including, for example a CD, a DVD, or a Blu-ray Disc). Examples of the media with a built-in rewriteable non-volatile memory, include but are not limited to memory cards; and media with a built-in ROM, including but not limited to ROM cassettes; etc. Furthermore, various information regarding stored images, for example, property information, may be stored in any other form, or it may be provided in other ways.

The apparatuses and methods described in this application may be partially or fully implemented by a special purpose computer created by configuring a general purpose computer to execute one or more particular functions embodied in computer programs. The functional blocks and flowchart elements described above serve as software specifications, which can be translated into the computer programs by the routine work of a skilled technician or programmer.

Although described with reference to specific examples and drawings, modifications, additions and substitutions of example embodiments may be variously made according to the description by those of ordinary skill in the art. For example, the described techniques may be performed in an order different with that of the methods described, and/or components such as the described system, architecture, devices, circuit, and the like, may be connected or combined to be different from the above-described methods, or results may be appropriately achieved by other components or equivalents.

A method according to at least one embodiment of the invention for noise reduction in image recordings serves in particular to produce a noise texture which approximates reality. An "image recording" is understood to be a digital image or the digital raw data thereof. Digital images comprise pixels (image points) which are arranged in a system of coordinates, usually on an X/Y plane or in an X/Y/Z spatial volume, and have a specific pixel value. This pixel value is usually brightness information and/or color information. Instead of "image recording" in the following, reference is simply made to an image, wherein this designation also signifies reconstructed images or raw data thereof.

In at least one embodiment, the method comprises:
providing an input image;
de-noising the input image and producing a de-noised input image; and
adapting the noise texture of pixels of the de-noised input image by way of an adaptation method, wherein the noise amplitude of the de-noised input image is largely retained and the noise texture of the pixels of the de-noised input image is adapted in such a way as to correspond largely to a predefined noise texture.

The input image is a digital image recording. The provision takes place by recording the input image or by transmission and receipt of the input image via a network, e.g. PACS (Picture Archiving and Communication System). This input image, e.g. a photograph, can be present in a JPEG format. In the field of medical engineering in particular, it can also be present in a DICOM format (DICOM: Digital Imaging and Communications in Medicine). It is emphasized again at this point that the term "input image" does not necessarily mean a reconstructed image. The input image may well consist of raw data or comprise raw data. Moreover, metainformation can also be included, e.g. in the header of a JPEG file or a DICOM file.

In practice, this input image always includes noise, wherein each pixel basically has a specific noise texture and this noise texture is superimposed in the whole image by the ideal pixel value of the individual pixels.

Since the pixels contain no subinformation other than their pixel values, the noise cannot be explained based upon a single pixel. In each uniform surface area in an image (where the pixel values should ideally all be the same), the noise is manifested by different pixel values in practice. When these pixel values are plotted in a histogram, a specific distribution is produced with an average value (which should correspond approximately to the ideal value) a width (which is a measure for the degree of noise and decreases as a result of de-noising) and a specific shape (which represents the noise texture). This shape often corresponds to a Gaussian distribution. Although it is unlikely that precisely uniform surface areas will always be recorded in practice, the noise can nonetheless be readily captured mathematically in these cases (and suppressed using arithmetic device(s)).

The input image is then de-noised. This is effected by way of a de-noising method as disclosed in the prior art. Such conventional de-noising methods are sufficiently well known to a person skilled in the art. As a result of the de-noising of the input image, a de-noised image is produced.

According to other systems, this step concludes the de-noising. However, the images that are de-noised in this way have a noise texture which does not appear normal to an observer. The noise texture, i.e. the shape of the noise component of the pixels, differs from the noise texture of a "normal" image in this case. A normal image that would correspond to the de-noised image would be an image which was recorded with a higher intensity, e.g. using a brighter illumination or a higher radiation dose. Such images have a characteristic noise texture, e.g. a Gaussian distribution.

A noise component thus shaped would be seen as natural by an observer and the image perceived as normal. When de-noising images, it often occurs that a noise component with Gaussian distribution in the input image becomes a noise component with hyper-Gaussian distribution in the de-noised image. This includes a larger portion of "outliers" towards the sides than a normal Gaussian distribution. In an image that was recorded with a higher dose, hyper-Gaussian distribution does not occur and normal Gaussian distribution is present again.

According to at least one embodiment of the invention, the de-noising is followed by an adaptation of the noise texture of pixels of the de-noised image. This is achieved by way of an adaptation method. In the context of this adaptation method, the noise amplitude of the de-noised image is largely retained and the noise texture of the pixels of the de-noised image is adapted in such a way as to correspond largely to a predefined noise texture. This predefined noise texture is a noise component with Gaussian distribution, for example.

It is therefore endeavored by way of the adaptation method to achieve or simulate the noise texture of an image of identical noise amplitude that was recorded with a high intensity. It should be noted that a noise texture is not assigned to an individual pixel, but to the entirety (or at least some) of the pixels of the image. If e.g. the pixels of a uniformly represented surface area were plotted in a histogram, this would reveal the Gaussian distribution of the input image, the hyper-Gaussian distribution of the de-noised image, and the "restored" Gaussian distribution of the adapted image.

Lastly, the adapted image, which can also be referred to as "resulting image" or "adapted image", is then usually output. This output can take place via a display screen (or a printer), for example, so that a medical professional can examine the de-noised and adapted images immediately.

However, the output can also include storing the image in a database or sending the image via a network.

As suggested above, the inventive method is preferably used for noise reduction in CT recordings. As mentioned previously, the term "CT recordings" in this case comprises both CT raw data and reconstructed CT images, reconstructed CT images being preferred as input images.

A CT recording is therefore provided as an input image, for example, and noise-optimized CT image reconstruction takes place using a conventional de-noising method. De-noising can therefore be performed during the course of the image reconstruction, but can also be applied to an image that has already been reconstructed. The conventional de-noising method will usually have the negative side effects described above. This results in CT image data which is admittedly optimized in respect of the noise in comparison with linearly reconstructed image data, but is judged by an observer to be non-equivalent or artificial in comparison with linearly reconstructed images with equally low noise (i.e. recorded with a higher dose).

The adaptation method is therefore now applied to the de-noised images, the method generating new image data from the de-noised images and specifically such that the noise amplitude, in the sense of the standard deviation in a comparison between the de-noised image and an image recorded correspondingly with a higher dose, is not significantly changed and only the noise texture is changed in such a way that an observer perceives it as equivalent to linearly reconstructed images of identical noise amplitude. Of course there are usually no images that have been recorded with a higher dose, this being precisely the aim of minimizing the dosage quota. However, the type of the noise texture of images that have been recorded with a high dose is known, and it is now the aim of the method to achieve this known noise texture by adapting the noise texture of the de-noised images.

At least one embodiment of the inventive device for noise reduction in image recordings works in particular with a method as claimed in one of the preceding claims. It comprises the following components:

A data interface designed to provide a digital input image. Such data interfaces are known to a person skilled in the art.

A de-noising unit designed to de-noise the image and produce a de-noised image. A de-noising unit is e.g. a computer on which a de-noising method runs as software. However, a de-noising unit can also be a completely virtual machine, i.e. an algorithm, which performs a de-noising method. Since this will be a conventional de-noising method, it is known to a person skilled in the art.

An adaptation device designed to adapt the noise texture of pixels of the de-noised image by way of an adaptation method, wherein the noise amplitude of the de-noised image is largely retained and the noise texture of the pixels of the de-noised image is adapted in such a way as to correspond largely to a predefined noise texture. This predefined noise texture therefore corresponds to the noise texture of an image that would have been recorded with a higher dose or intensity.

In the context of at least one embodiment of the invention, an adaptation device or an adaptation method is most preferably based on methods in the field of artificial intelligence. Even very complex problems can be solved by way of artificial intelligence. A proposed solution to the problem of an "artificial" image impression therefore involves the use of AI-based methods (AI: artificial intelligence) for the purpose of noise reduction with retained structures.

Artificial intelligence is based on the principle of machine learning, and is usually implemented by way of a learning-capable algorithm that has been trained accordingly. The expression "machine learning" as used here also includes the principle of "deep learning". For example, a Deep Convolutional Neural Network (DCNN) is trained to restore, from de-noised CT images recorded with a low dose (and therefore high noise), a situation with a high dose (and therefore low noise). In this case, the situation with a high dose is known from the training.

A production method according to at least one embodiment of the invention is used to produce an adaptation device with a learning-capable algorithm. This learning-capable algorithm is used to execute the adaptation method in the context of a method according to at least one embodiment of the invention. The production method comprises the following steps for training the learning-capable algorithm:

Providing a multiplicity of initial training images that were recorded with a predefined dose. In comparison with the dose of the input images, this predefined dose is a comparatively high dose. The level of the dose in this case should correspond to that which results in images that have a similar noise amplitude to the de-noised images. Since in practice use will be made of existing images previously recorded in the context of other medical examinations (of other patients), it is preferable to select those images which most closely correspond to the de-noised results in respect of the noise amplitude. Since the de-noising method is already known (in that a conventional de-noising method is applied), the type of images that should be used for the training is also known.

Adding noise to the training images, such that the resulting added-noise training images correspond in respect of the type of added noise to the input images that are to be processed in the specified manner by the inventive method. The type of noise of the input images is predefined. The dose with which the input images will be recorded is known. This known dose indicates the noise which these images are very likely to have. The degree of the noise of the input images is therefore known, from which it follows that the degree to which noise must be added to the training images that are used here is also known.

De-noising the added-noise training images, preferably by way of the de-noising method that is applied in the specified manner as part of the inventive method, and creating de-noised training images. The added-noise training images are therefore de-noised again. For the purpose of de-noising, that de-noising method is preferably applied which is also envisaged for use as part of the inventive method. This has the advantage that the adaptation of de-noised input images can be tailored to the previous de-noising. This step results in the de-noised training images being available.

These de-noised training images do not however correspond to the initial training images. As a result of the de-noising step, the de-noised training images now have a noise texture which differs from the noise texture of the initial training images. This noise texture produces in an observer the impression that these images are artificial. The trained algorithm is intended to counteract precisely this impression. To this end, the algorithm must now be trained in a particular way, specifically using the de-noised training images and the initial training images. This involves Training the learning-capable algorithm with the "target" of adapting the de-noised training images to the initial training images in respect of the shape of the noise.

An inventive adaptation device for executing the adaptation method in the context of a method according to at least one embodiment of the invention comprises a learning-capable algorithm that has been trained by way of a production method according to at least one embodiment of the invention.

An inventive control facility of at least one embodiment for controlling a computed tomography system is designed to perform a method according to at least one embodiment of the invention and/or the production method according to at least one embodiment of the invention and/or comprises a device according to at least one embodiment of the invention.

An inventive computed tomography system of at least one embodiment comprises a control facility according to at least one embodiment of the invention.

A large part of the components cited above in relation to the device, the adaptation device or the control facility can be realized entirely or partly in the form of software modules in a processor of a corresponding (adaptation) device or control facility. A largely software-based realization has the advantage that (adaptation) devices or control facilities already in use can also be upgraded easily by way of a software update in order to work in the inventive manner of at least one embodiment.

To this extent, at least one embodiment is also directed to a corresponding computer program product comprising a computer program which can be loaded directly into a computing system or a storage facility of a control facility of a computed tomography system, with program sections for executing all steps of at least one embodiment of the inventive method when the program is executed in the computing system or the control facility. In addition to the computer program, such a computer program product can optionally comprise additional parts such as e.g. documentation and/or additional components including hardware components such as e.g. hardware keys (dongles etc.) for using the software.

For transportation to the computing system or the control facility and/or for storage at or in the computing system or the control facility, use can be made of a computer-readable medium, e.g. a memory stick, a hard disk or other transportable or integrated data medium, on which are stored the program sections of the computer program that can be read in and executed by a computing system or a computer unit of the control facility. For this purpose, the computer unit can have e.g. one or more interworking microprocessors or similar.

Further, in particular advantageous, embodiments and developments of the invention are derived from the dependent claims and from the following description, wherein the claims belonging to one class of claim can also be developed in a similar manner to the claims and parts of the description relating to another class of claim, and in particular individual features from various example embodiments or variants can also be combined to form novel example embodiments or variants.

As part of a preferred method, the adaptation method is performed using an algorithm which adapts the de-noised image based upon an adaptation function A. This adaptation function modifies the de-noised image in such a way that it resembles an image which has been recorded with a higher dose. This evokes a natural impression of the image in an observer. The algorithm can be a conventional algorithm which works linearly. However, the algorithm can also be based on the principle of machine learning, i.e. represent an artificial intelligence.

The adaptation function A in this case was preferably selected and/or produced based upon a metric M. In this case, the metric quantifies differences in the noise texture between a de-noised image that has been adapted by way of an adaptation function A' and a predefined noise texture. It is then possible, from a range of training adaptation functions A', to select as adaptation function A e.g. that which has the fewest differences in relation to the predefined noise texture. The algorithm can be realized in the form of a conventional model-based algorithm with free parameters, for example. The negative texture change of the de-noised image can consist of e.g. changes to the pixel value distribution (e.g. of a histogram). Let it be assumed that the original distribution in the input image is Gaussian. Following a conventional noise reduction, the noise distribution in the de-noised image may be hyper-Gaussian, i.e. containing outliers towards the sides of the distribution. The model for improving texture must therefore aim to remove outliers. By selecting a suitable adaptation function or by training the algorithm, the adaptation function can be configured (e.g. its free parameters optimized) such that the metric of the comparison between the adapted de-noised image and an image that was recorded with a higher dose is minimal. The device/system by which this can be achieved in the context of training is described in greater detail below.

As part of a preferred method, the adaptation method is performed using a learning-capable algorithm, in particular a Deep Learning algorithm, preferably a convolutional network (CNN or DCNN). In this case, the learning-capable algorithm has preferably been trained in such a way that a multiplicity of training images which were recorded with high intensity have had noise added artificially, these added-noise training images have been de-noised by way of the de-noising method, and the learning-capable algorithm has been trained with the target of recreating the original training images from the de-noised images.

As part of a preferred method, in addition to image data, further metainformation is used by the adaptation method. This metainformation is present in addition to the image data (e.g. in the header of an image file) and is used during the processing of an input image or a training image. In this way, it is possible to e.g. explicitly supply known qualitative differences of a CT reconstruction to the training. The metainformation includes e.g. convolution kernel (or properties thereof), the modulation transfer function (MTF), overawing, noise grain size, voxel size or signal level of the measured data (which allows the expected noise in the input data to be inferred).

As part of a preferred method, in the context of the adaptation of the noise texture of pixels of the de-noised image, a Gaussian noise texture is derived from a hyper-Gaussian noise texture of the added-noise image, and the hyper-Gaussian noise texture is replaced by a Gaussian noise texture.

As part of a preferred production method, in the context of the training, the added-noise image Iv is adapted to the initial image I0 by way of an adaptation function A. In addition to this, a metric M is selected which represents a measure of the differences in the noise texture of A(Iv) and I0, i.e. the adapted de-noised training image and the initial training image. The extent to which the de-noised image and the initial training image differ in respect of the noise texture is therefore ascertained. In this way, the metric allows the difference to be ascertained quantitatively. Variations comprise e.g. variations in the color and/or the intensity of the pixels at corresponding image coordinates.

The adaptation function A is configured by repeatedly modifying a training adaptation function A' and calculating the metric M in such a way that the differences in the noise textures of A(Iv) and I0 are minimized for a multiplicity of the initial images. A training adaptation function A' is therefore used which adapts the de-noised training images to the initial training images. The metric is then used to quantitatively ascertain the quality of this adaptation, and another training adaptation function A', by which the de-noised training images are likewise adapted to the initial training images, is selected. It is thus endeavored to seek a minimal variation in the quality of the adapted training images in comparison with the initial training images, obviously in relation to the selected metric which allows the quality to be quantified.

In a preferred production method, the adaptation function A is produced by solving the formula:

$$A = \mathrm{argmin}_{A'} M\{A'(Iv), I0\}, \quad (1)$$

i.e. by ascertaining the optimal training adaptation function A'. In this case, use is made again of the metric M, the de-noised training image Iv and the initial training image I0. The trained adaptation device will then execute the adaptation function A in the context of the inventive method, A being derived from the cited formula (1) in the context of the training. The training of the adaptation device (e.g. a CNN) is therefore governed by the requirement that A'(Iv) should approximate the image data of the initial training image I0 (image data recorded with high dose).

To this end, the metric M should be so selected as to appropriately judge the variations in the noise textures of the image adapted with A'(Iv) and the respective initial image I0. By virtue of the aim to minimize these variations, an optimized adaptation function A is developed for an image. By running the optimization for a multiplicity of initial training images, the resulting adaptation function A is determined. This represents the training, and the trained adaptation device is then in a position to adapt unknown input images based upon this adaptation function A.

As part of a preferred production method, the metric M is a measure corresponding to the mean quadratic error and/or is (e.g. additively) made up of parts which require the preservation of local average values (e.g. L1 norm) and/or measure the similarity of the noise texture, e.g. structural similarity index (SSIM) or multi-scalar SSIM, wherein the choice of metric preferably depends on a predefined anatomical region and/or a diagnostic query (see e.g. Zhao et. al, arXiv:1511.08861v3, 2018). The training can basically make use of all known methods, e.g. augmentation.

Components of an embodiment of the invention are preferably present in the form of a "cloud service". Such a cloud service is used for the processing of data, in particular by way of an artificial intelligence, but can also be a service based on conventional algorithms or a service in which evaluation by humans takes place in the background. A cloud service (also abbreviated as "cloud" in the following) is generally an IT infrastructure in which e.g. storage space or processing power and/or application software is available over a network. In this case, communication between the user and the cloud takes place via data interfaces and/or data transfer protocols. In the present case, the cloud service ideally provides both computing power and application software.

In the context of a preferred method, data is provided via the network to the cloud service. This comprises a computing system, e.g. a computer cluster, which does not usually include the local computer of the user. In particular, the cloud may be provided by the medical facility which also provides the medical engineering systems. For example, the data relating to an image recording is sent via an RIS (Radiology Information System) or PACS to a (remote) computer system (the cloud). The computing system of the cloud, the network, and the medical engineering system preferably represent a framework in terms of data processing. The method can be realized in this case by a combination of commands in the network. Data that is calculated in the cloud ("result data") is subsequently sent back to the local computer of the user via the network.

In the following explanations, it is assumed that the imaging installation is a computed tomography system. However, the method can in principle also be used with other imaging installations or equipment, e.g. in the context of photography.

FIG. 1 schematically shows a computed tomography system 1 with a control facility 10 for performing the method according to an embodiment of the invention. As is usual, the computed tomography system 1 has a scanner 2 comprising a gantry within which rotates an x-ray source 3 that irradiates a patient who is pushed into a measurement chamber of the gantry by way of a couch 5 such that the radiation strikes a detector 4 which is situated opposite the x-ray source 3 in each case. It is noted explicitly here that the example embodiment according to this figure is merely one example of a CT, and the invention can also be used with any chosen CT configuration, e.g. comprising an annular fixed-position x-ray detector and/or a plurality of x-ray sources.

With regard to the control facility 10 likewise, only those components necessary to explain the invention are shown. Such CT systems and associated control facilities are generally known to a person skilled in the art and therefore need not be explained in detail.

A core component of the control facility 10 here is a processor 11 on which various components are realized in the form of software modules. The control facility 10 also has a terminal interface 14 to which a terminal 20 is attached and via which an operator can operate the control facility 10 and therefore the computed tomography system 1. A further interface 15 is a network interface for attaching to a data bus 21 in order thus to establish a connection to an RIS (Radiology Information System) or PACS (Picture Archiving and Communication System).

The scanner 2 can be driven from the control facility 10 via a control interface 13, i.e. the rotation speed of the gantry, the displacement of the patient couch 5 and the x-ray source 3 itself are controlled, for example. The raw data RD is read out from the detector 4 via an acquisition interface 12. The control facility 10 also has a storage unit 16 in which inter alia various measurement protocols are stored.

A component on the processor 11 is an image data reconstruction unit 18 by which the desired data image is reconstructed from the raw data RD received via the data acquisition interface 12.

The image data reconstruction unit 18 here comprises an inventive device 6 for noise reduction in image recordings. This device 6 comprises a data interface 7 designed to provide an image, a de-noising unit 8 designed to de-noise the image and produce a de-noised image, and an adaptation device 9.

The adaptation device 9 is designed to adapt the noise texture of pixels of the de-noised image Ie by way of an adaptation method, wherein the noise amplitude of the de-noised image Ie is largely retained and the noise texture of the pixels of the de-noised image is adapted in such a way as to correspond largely to a predefined noise texture.

The result of the adaptation is an adapted image Ea or resulting image Ea (see e.g. FIG. 5).

Figure 2:
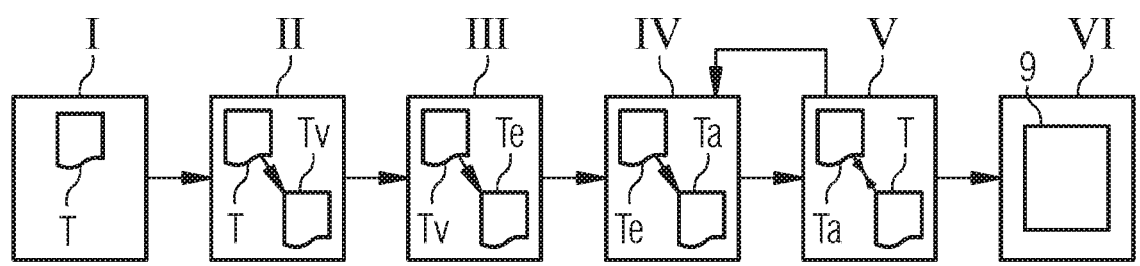
FIG. 2 shows a schematic representation of an example embodiment of a production method.
Figure 4:
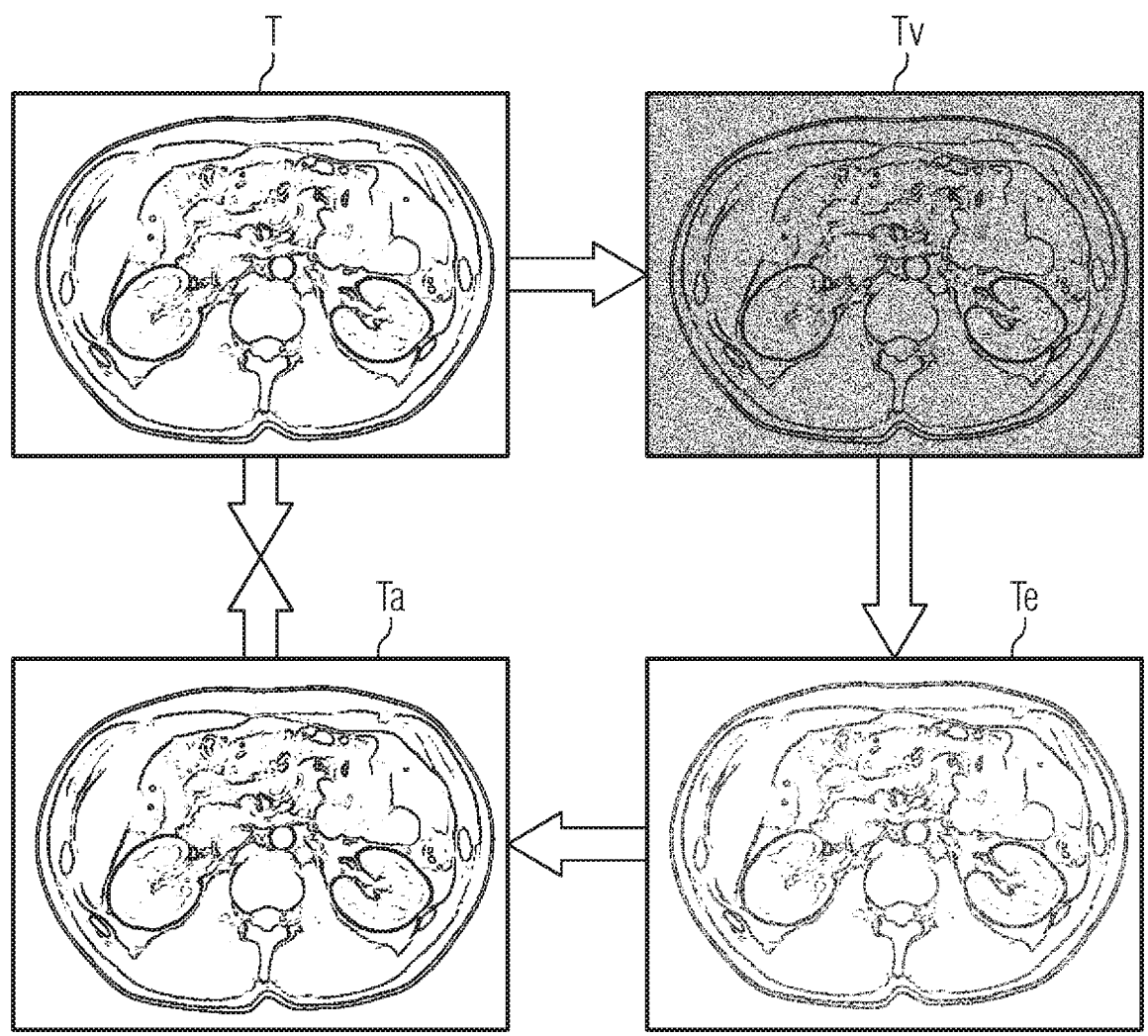
FIG. 4 shows the change of a training image in the context of a preferred production method.

FIG. 2 shows a schematic representation of an example embodiment of an inventive production method for producing an adaptation device 9 (see e.g. FIG. 1) comprising a learning-capable algorithm. This production method comprises training the learning-capable algorithm according to the following steps:

In step I, a multiplicity of initial training images T are provided which were recorded with a predefined dose, e.g. CT images as per FIG. 4.

Figure 3:
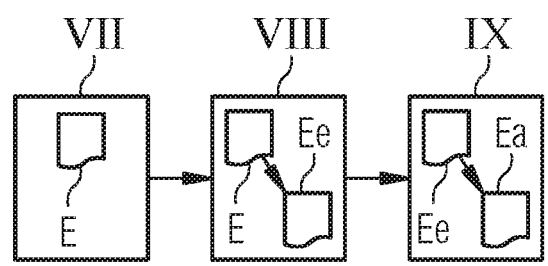
FIG. 3 shows a schematic representation of an example embodiment of a method according to the invention.

In step II, noise is added to the training images T so that the resulting added-noise training images Tv correspond in respect of the type of added noise to the input images E which are to be processed in the specified manner by a method according to an embodiment of the invention (see e.g. FIG. 3 or FIG. 5).

In step III, the added-noise training images Tv are de-noised, preferably by way of the de-noising method which is applied in the specified manner as part of an embodiment of the inventive method, and de-noised training images Te are created in this context.

The following two steps represent the core of the training.

In step IV, the de-noised training images Te are adapted by way of an adaptation function, whereby adapted training images Ta are produced.

In step V, the adapted training image Ta is compared with the initial training image T. A metric can readily be used here so that the comparison can be quantitatively captured. It is endeavored to select the adaptation function such that the difference between the adapted training image Ta and the initial training image T is as small as possible.

In step VI, the training is concluded. The result is a trained adaptation device 9.

FIG. 3 shows a schematic representation of an example embodiment of an inventive method for noise reduction in image recordings.

In step VII, an input image E is provided, e.g. a CT image as shown in FIG. 5.

In step VII, the input image E is de-noised and a de-noised input image Ee is produced.

In step VII, the noise texture of pixels of the de-noised input image Ee is adapted by way of an adaptation method, wherein the noise amplitude of the de-noised input image Ee is largely retained and the noise texture of the pixels of the de-noised input image Ee is adapted in such a way as to correspond largely to a predefined noise texture. In this context an adapted image Ea is produced as a resulting image Ea which can be displayed to a medical professional or stored for subsequent assessment.

FIG. 4 shows the change of a training image T in the context of a preferred production method. A training image T (a CT recording) is shown at the top left. The visible contours in this training image T are very clear because the training image T was recorded with a considerably high dose. In the context of the production method, as indicated by the arrow pointing right, noise is now added to the training image T to give an added-noise training image Tv (top right). In a following step of the production method, the added-noise training image Tv is now de-noised so that a de-noised training image Te is produced (bottom right) as indicated by the arrow pointing down. An adaptation of the de-noised training image Te then takes place, as indicated by the arrow pointing left and an adapted training image Ta is produced. In the context of the training, the adapted training image Ta and the original initial training image T are then compared with each other. If the difference is only minimal, a partial target of the training has been achieved. If the difference is great, the whole sequence is performed again.

The training is obviously performed using many different training images, such that an optimization of the algorithm is ultimately achieved as a result of continuous training with the aid of a multiplicity of training images.

FIG. 5 shows the change of input image E in the context of a preferred method. On the left is the input image E, here a CT recording with distinct noise. In the center is a de-noised image Ee which has been produced in the context of the method by de-noising the input image E as indicated by the arrow. On the right is the resulting image Ea, in which it is clear to see that the contours are more distinct, as in the case of a CT image that was recorded with a significantly higher dose.

It is again noted in conclusion that the methods described in detail above and the computed tomography system 1 shown here are merely example embodiments that can be modified in all manner of ways by a person skilled in the art without departing from the scope of the invention. Furthermore, the use of the indefinite article "a" or "an" does not preclude multiple occurrences of the relevant features. Equally, the terms "unit" and "module" do not preclude the relevant components comprising multiple interacting sub-components, which can also be spatially distributed if applicable.

The patent claims of the application are formulation proposals without prejudice for obtaining more extensive patent protection. The applicant reserves the right to claim even further combinations of features previously disclosed only in the description and/or drawings.

References back that are used in dependent claims indicate the further embodiment of the subject matter of the main claim by way of the features of the respective dependent claim; they should not be understood as dispensing with obtaining independent protection of the subject matter for the combinations of features in the referred-back dependent claims. Furthermore, with regard to interpreting the claims, where a feature is concretized in more specific detail in a subordinate claim, it should be assumed that such a restriction is not present in the respective preceding claims.

Since the subject matter of the dependent claims in relation to the prior art on the priority date may form separate and independent inventions, the applicant reserves the right to make them the subject matter of independent claims or divisional declarations. They may furthermore also contain independent inventions which have a configuration that is independent of the subject matters of the preceding dependent claims.

None of the elements recited in the claims are intended to be a way-plus-function element within the meaning of 35 U.S.C. § 112(f) unless an element is expressly recited using the phrase "way for" or, in the case of a method claim, using the phrases "operation for" or "step for."

Example embodiments being thus described, it will be obvious that the same may be varied in many ways. Such variations are not to be regarded as a departure from the spirit and scope of the present invention, and all such modifications as would be obvious to one skilled in the art are intended to be included within the scope of the following claims.

What is claimed is:

1. A method for noise reduction in an image, comprising:
   providing an input image, the input image being a reconstructed computed tomography (CT) image;
   de-noising the input image and producing a de-noised input image; and
   adapting a noise texture of the de-noised input image via an adaptation method to produce an adapted image, the adaptation method including replacing the noise texture of the de-noised input image by a noise texture of the adapted image via an algorithm which adapts the de-noised input image based on an adaptation function, the noise texture of the de-noised input image being hyper-Gaussian, the noise texture of the adapted image being Gaussian, wherein a noise amplitude of the de-noised input image is retained during the adaptation method.

2. The method of claim 1, wherein the adapting is performed using a learning-capable algorithm.

3. The method of claim 1, wherein further meta-information, present in addition to image data, is provided in the providing, and wherein the meta-information is used during processing of at least one of the input image and a training image.

4. A device for noise reduction in image recordings, comprising:
- a data interface configured to provide an input image, the input image being a reconstructed computed tomography (CT) image;
- a de-noising device configured to de-noise the input image and produce a de-noised input image; and
- an adaptation device configured to adapt a noise texture of the de-noised input image via an adaptation method to produce an adapted image, the adaptation method including replacing the noise texture of the de-noised input image by a noise texture of the adapted image via an algorithm which adapts the de-noised input image based on an adaptation function, the noise texture of the de-noised input image being hyper-Gaussian, the noise texture of the adapted image being Gaussian, wherein a noise amplitude of the de-noised input image is retained during the adaptation method.

5. A production method for producing an adaptation device including a learning-capable algorithm, comprising training the learning-capable algorithm by at least:
- providing a multiplicity of initial training images recorded with a defined dose;
- adding noise to the multiplicity of initial training images resulting in added-noise training images, corresponding in respect of a type of added noise, to input images to be processed in the method of claim 1;
- de-noising the added-noise training images and creating de-noised training images; and
- training the learning-capable algorithm with a target of adapting the de-noised training images to the multiplicity of initial training images in respect of a shape of the noise.

6. The production method of claim 5, wherein, in a context of the training of the learning-capable algorithm, an adaptation of an added-noise training image (Tv)Iv to an initial training image (T)I0 takes place via an adaptation function A and a metric M is selected representing a measure of differences in the noise texture of A(Iv) and I0, and the adaptation function A is configured by repeatedly modifying a training adaptation function A' and calculating the metric M such that the differences in noise textures of A'(Iv) and I0 are minimized for the multiplicity of the initial training images (T).

7. The production method of claim 6, wherein the adaptation function A is derived by adapting the training adaptation function A' according to formula $A=\mathrm{argmin}_{A'} M\{A'(Iv), I0\}$.

8. The production method of claim 6, wherein the metric M is at least one of a measure corresponding to a mean quadratic error and is made up of parts requiring preservation of local average values, and measure similarity of the noise texture, and wherein a choice of metric depends on at least one of a defined anatomical region and a diagnostic query.

9. An adaptation device for executing the adaptation method, comprising a learning-capable algorithm trained via the production method of claim 5.

10. A control facility for controlling a computed tomography system, comprising:
the device of claim 4.

11. A computed tomography system comprising the control facility of claim 10.

12. A non-transitory computer program product storing a computer program, directly loadable into a storage facility of a control facility of a computed tomography system, program sections being configured to execute the method as of claim 1 when the computer program is executed in the control facility.

13. A non-transitory computer-readable medium storing program sections, readable and executable by a computer unit, to execute the method of claim 1 when the program sections are executed by the computer unit.

14. The method of claim 1, wherein the adaptation function A was at least one of selected and produced based upon a metric which quantifies differences in the noise texture between a de-noised input image, adapted using an adaptation function A', and a defined noise texture.

15. The method of claim 2, wherein the learning-capable algorithm is a Deep Learning algorithm, wherein the learning-capable algorithm has been trained such that a multiplicity of training images, recorded with high intensity, have had noise added artificially forming a multiplicity of added-noise training images, wherein the multiplicity of added-noise training images have been de-noised by way of the de-noising to form de-noised training images, and wherein the learning-capable algorithm has been trained with a target of recreating original training images from the de-noised training images.

16. The production method of claim 7, wherein the metric M is at least one of a measure corresponding to a mean quadratic error and is made up of parts requiring preservation of local average values, and measure similarity of the noise texture, and wherein a choice of metric depends on at least one of a defined anatomical region and a diagnostic query.

* * * * *